Feb. 23, 1926.
R. M. WILHELM
1,574,459
THERMOMETER
Filed July 3, 1925
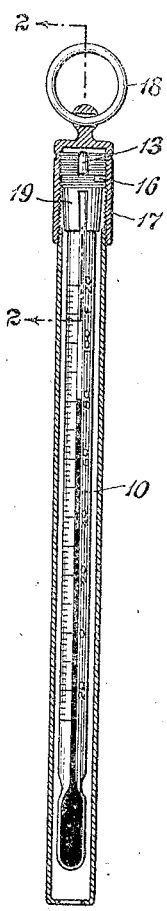
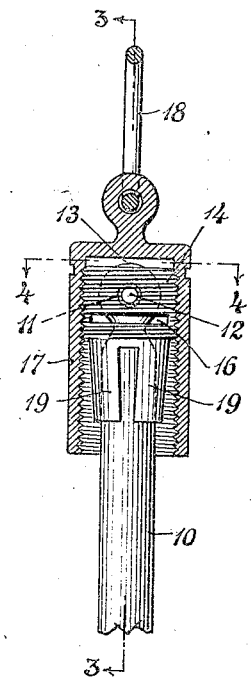
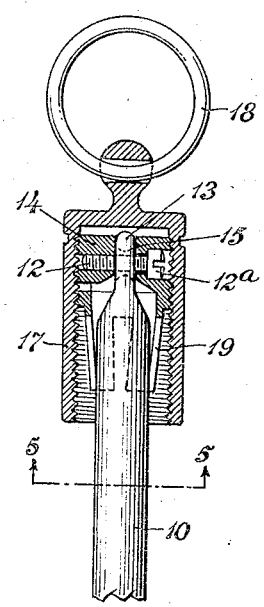
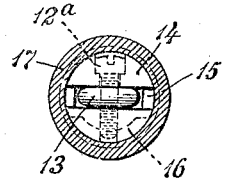
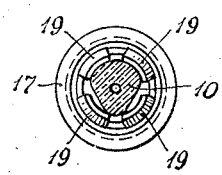
WITNESS
G. V. Rasmussen
INVENTOR
ROBERT M. WILHELM
BY
Niesen Schrenk
ATTORNEYS Patented Feb. 23, 1926.

1,574,459

UNITED STATES PATENT OFFICE.

ROBERT M. WILHELM, OF BROOKLYN, NEW YORK, ASSIGNOR TO CHARLES J. TAGLIA-BUE MFG. CO., OF NEW YORK, N. Y., A CORPORATION OF NEW YORK.

THERMOMETER.

Application filed July 3, 1925. Serial No. 41,282.

*To all whom it may concern:*

Be it known that I, ROBERT M. WILHELM, a citizen of the United States, and resident of the borough of Brooklyn, county of Kings, city and State of New York, have invented certain new and useful Improvements in Thermometers, of which the following is a specification.

My invention relates to thermometers and more particularly to that class of such instruments which are generally referred to as pocket thermometers, armored thermometers and the like and which include a protecting cover for the thermometer, either retectively movably or permanently fixed in place thereon. Heretofore the mercury tubes of thermometers of this type have been secured in said covers or parts thereof by litharge or other cement or by means of a device which required the thermometer to be made with a flat or mushroom top instead of in the form most commonly made and including a ring or transversely apertured top. The object of this invention is to provide a device whereby thermometers of the indicated class and in a form customarily produced may be fastened in place in the protecting covers or parts thereof in a novel and efficient manner, without the use of cements or the like and without requiring any alteration in the form of the thermometer. Other more specific objects will appear from the description hereinafter and the features of novelty will be pointed out in the claims.

In the accompanying drawing, which illustrates an example of the invention without defining its limits, Fig. 1 is a sectional elevation of a thermometer embodying the novel features; Fig. 2 is an enlarged fragmentary section showing the invention in detail; Fig. 3 is a similar view looking at right angles to Fig. 2; Fig. 4 is a cross-section on the line 4—4 of Fig. 2 and Fig. 5 is a similar view on the line 5—5 of Fig. 3.

As shown in the drawing, the thermometer 10 is provided at one end with an aperture 11, the axis of which is transverse to the major axis of the thermometer and through which a fastening device 12 passes, the latter in combination with other elements to be described hereinafter serving to secure the thermometer in place in a protecting cover or a predetermined part thereof, this depending upon the character of the cover in question.

In the illustrated example the thermometer 10 is of the conventional form commonly referred to as "ring-top" thermometers which include a flattened extension 13 at one end having the aperture 11 extending transversely therethrough. A plug 14 is fitted over the apertured end of the thermometer 10 for instance by being provided with a recess 15 for the accommodation of the flattened extension 13, the arrangement preferably being such that the extension 13 fits into said recess 15 as shown in Fig. 4. Preferably a circumferential slot 16 is provided in the plug 14 in such a location and of such arrangement as to permit the plug sections upon opposite sides of the recesses to be drawn up so as to reduce the transverse width of the recess 15 and thereby cause the apertured end or flattened end extension 13 to be firmly gripped therein. The fastening device 12 preferably comprises a suitable screw which is removably connected with the plug 14 and passes through the aperture 11 and thus serves to attach the plug 14 and thermometer 10 to each other; in the preferred arrangement the screw 12 passes loosely through the plug 14 upon one side of the recess 15 and screwthreads into the same upon the opposite side of said recess, the head 12ᵃ of said screw being countersunk so as not to project beyond the outer surface of said plug 14. The latter is removably fitted within a cap 17 which extends over the apertured end of the thermometer 10, it being understood that the cap 17 shown in the drawing is intended to be illustrative of the caps and protecting covers which are generally found in thermometers of the class referred to; in the preferred construction, the plug 14 is externally screwthreaded and the cap 17 is internally screwthreaded for detachable connection with each other. If desired the cap 17 or its equivalent may be provided with a ring 18 or similar device for suspending the thermometer or for attaching a chain or the like thereto.

Preferably the device further includes means, preferably resilient, within said cap 17 or its equivalent whereby the thermometer is fixed against vibration relatively to said cap; in the illustrated example the means referred to is shown in the form of resilient members 19 projecting from the plug 14 into gripping engagement with the thermometer 10 as shown in Figs. 2 and 3.

In practice the plug 14 is fitted over the extension 13 of the thermometer 10 and fixed in place thereon by means of the screw 12 which passes through the aperture 11, it being understood that when the plug is thus attached to the thermometer, the resilient members 19 are in gripping engagement with the thermometer 10 as shown in Figs. 1 and 2. After having been combined with the thermometer 10, the plug 14 is screwed into the cap 16 until it engages the inner end face of said cap as shown in Figs. 1 and 2. In this way the thermometer is efficiently connected with the cap, protecting cover or its equivalent in a simple manner without requiring the use of cement or the like and without requiring an existing and well known form of thermometer to be altered in any way and enables such thermometer to be efficiently connected with such cap or its equivalent; furthermore the invention provides a simple device whereby thermometers generally may be efficiently combined with caps, protecting covers and the like.

No wrench or other implement is required in effecting the combination of the thermometer with the cap or its equivalent as the plug 14 may be screwed or otherwise fitted into said cap by means of the thermometer itself.

If the thermometer becomes broken it may easily be detached from the plug and replaced with a new thermometer by simply removing and replacing the screw 12 or its equivalent. It is thus possible to retain the use of the cap and of the attaching device indefinitely and without regard to the life and usefulness of any given thermometer.

Various changes in the specific form shown and described may be made within the scope of the claims without departing from the spirit of my invention.

I claim:

1. The combination of a thermometer provided at one end with an aperture, the axis of which is transverse to the major axis of the thermometer, a cap extending over the apertured end of said thermometer, and a fastening device passing through said aperture and connected with said cap whereby said thermometer and cap are attached to each other.

2. The combination of a thermometer provided at one end with an aperture, the axis of which is transverse to the major axis of the thermometer, a cap extending over the apertured end of said thermometer, and a fastening device passing through said aperture and connected with said cap whereby said thermometer and cap are attached to each other, and resilient means within said cap whereby said thermometer is fixed against vibration relatively to said cap.

3. The combination of a thermometer provided at one end with an aperture the axis of which is transverse to the major axis of the thermometer, a cap extending over the apertured end of said thermometer, and a removable fastening screw passing through said aperture and connected with said cap whereby said thermometer and cap are attached to each other.

4. The combination of a thermometer provided at one end with an aperture the axis of which is transverse to the major axis of the thermometer, a cap extending over the apertured end of said thermometer, a plug removably fixed within said cap and fitted over said apertured end of the thermometer, and a fastening device connected with said plug and passing through said aperture whereby said thermometer and plug are attached to each other.

5. The combination of a thermometer, a flattened extension at one end of said thermometer provided with a transverse aperture, and externally screwthreaded plug provided with a recess fitted over said flattened extension, a fastening screw connected with said plug and passing through said aperture whereby said plug and thermometer are attached together, resilient members projecting from said plug into gripping engagement with said thermometer to fix the same against vibration relatively to said plug, and an internally screwthreaded cap screwed upon said plug and connected thereby with said thermometer.

6. The combination of a thermometer, a flattened extension at one end of said thermometer provided with a transverse aperture, an externally screwthreaded plug provided with a recess fitted over said flattened extension, and having a circumferential slit arranged to permit the plug section on one side of said recess to be manipulated to reduce the transverse width thereof and to thereby cause said flattened extension to be gripped therein, a fastening screw connected with said plug and passing through said aperture whereby the flattened extension is fixed in said recess and an internally screwthreaded cap screwed upon said plug and connected thereby to said thermometer.

7. The combination of a thermometer, a flattened extension at one end of said thermometer provided with a transverse aperture, an externally screwthreaded plug provided with a recess fitted over said flattened extension, and having a circumferential slit arranged to permit the plug section on one side of said recess to be manipulated to reduce the transverse width thereof and to thereby cause said flattened extension to be gripped therein, a fastening screw connected with said plug and passing through said aperture whereby the flattened extension is fixed in said recess, a fastening screw connected with said plug and passing through said aperture whereby said plug and thermometer are attached together, resilient members projecting from said plug into gripping engagement with said thermometer to fix the same against vibration relatively to said plug, and an internally screw-threaded cap screwed upon said plug and connected thereby with said thermometer.

In testimony whereof I have hereunto set my hand.

ROBERT M. WILHELM.